Patented Aug. 26, 1952

2,608,479

UNITED STATES PATENT OFFICE 2,608,479

DESTRUCTION OF CRAB GRASS

Loyd Q. Boyd, Hammond, Ind., and Albert A. Endres, Homewood, Ill., assignors to Standard Oil Company, Chicago, Ill., a corporation of Indiana No Drawing. Application October 27, 1950, Serial No. 192,620

8 Claims. (Cl. 71—2.3)

This invention relates to an improved method and means for destroying crab grass and it pertains more particularly to compositions and their method of application to lawn turf for destroying crab grass without destroying blue grass or other desired grasses.

Crab grasses (Digitaria sanguinalis and digitaria ischaemum) are major weed pests of lawn turfs throughout most of the United States. They have presented home owners and others concerned with the growing of grassed areas with one of their most difficult and persistent problems. Many weed killers are effective against all vegetation and certain weed killers (such as 2,4-D) are effective against broad leafed weed pests but not against narrow leafed grasses; such prior herbicides or weed killers have not been effective for destroying crab grass without unduly injuring blue grass, bent grasses or other grasses which are desirable in lawn turf. The object of our invention is to solve the problem of destroying crab grass in lawn turf without undue harm to blue grass or other desirable grasses.

We have discovered that thiocyano ethers and esters of types previously known to the art as insecticides have the remarkable and surprising property of selectively destroying crab grass when applied to a lawn turf in proper concentration. These thiocyano ethers and esters may be applied either in an aqueous medium or a hydrocarbon medium such as a saturated hydrocarbon fraction boiling in the range of about 250° to 500° F. When employed in an aqueous medium, they are preferably emulsified in water and applied in concentrations of about 1 to 4 volumes of the thiocyano ester or ether per 100 volumes of water. When employed in a hydrocarbon oil, the amount of thiocyano ester or ether should be in the range of about .2 to 2% by volume. Best results are obtained by applying the aqueous emulsion or hydrocarbon solution in an amount sufficient to apply about 1 to 2 gallons of dithiocyano esters or ethers per acre, this amount being in the range of about 1 to 4 gallons per acre when applied in an aqueous medium and in amounts of about .1 to 2 gallons per acre when applied in the saturated narrow boiling hydrocarbon distillate.

The thiocyano ethers which we have found to be most effective are such compounds as beta-butoxy-beta'-thiocyanodiethyl ether

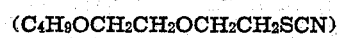

beta-beta'-dithiocyanodiethyl ether

and the like, which are well-known insecticides. Examples of thiocyano esters are isobornyl-thiocyano acetate, fenchyl-thiocyano acetate and beta-thiocyano ethyl esters of aliphatic acids, preferably containing 10 to 18 carbon atoms per molecule. Other organic and particularly aliphatic thiocyanates having the equivalent toxic properties may be employed, but we have found that inorganic thiocyanates, such as potassium thiocyanates and ammonium thiocyanates are unsuitable since they destroy unduly large amounts of blue grass and other desirable grasses in the turf. Organic thiocyanates employed for insecticidal purposes are limited in number because many members of the class are skin irritants so that they cannot be applied to animals; since our composition is not intended for use as an insecticide and is not to be applied to animals, any skin irritating tendencies are of no consequence. Our invention, however, is particularly applicable to the thiocyano ethers and esters of the type hereinabove set forth.

It has recently been discovered that refined saturated hydrocarbon distillates boiling entirely within the range of 350 to 500° F. are per se quite effective for crab grass control. Such an oil has been applied to the turf at about midsummer when the crab grass plants first became noticeable or were about 1 to 2 inches in length. In this case the oil was applied three times at 10 day intervals using a total of 240 gallons per acre. The spraying with such oil has also been effected when the crab grass was nearly ready to form seed heads and in this case only two sprays were used, the total again being 240 gallons per acre. We have found that our improved sprays are effective in a single application and that they give results which are even better than the multiple spray procedure heretofore practiced.

Our aqueous emulsion or hydrocarbon solution should be applied in such a way as to insure the wetting of the crab grass. Generally, the spray nozzle should be held about 10 to 20 inches from the top of the grass, depending upon the fineness of the spray. With a fine spray the nozzle should be close to the grass and with coarser sprays, it may be spaced at a greater distance. The nozzles should be designed to deliver a coarse driving spray as distinguished from the fine misty spray because a fine mist is not effective in securing efficient wetting of the crab grass. The amount discharged from the spray should, of course, be so proportioned so as to provide uniform coverage at the rates hereinabove defined, i. e. about 80 gallons per acre or sufficient to distribute about 1 to 2 gallons of the dithiocyano ethers or esters per acre.

Under conditions where grass is so tall that it is difficult to restrict the gallonage applied to as little as 80 gallons per acre, more water may be added to the aqueous emulsion or the hydrocarbon oil solution may be emulsified in water to secure the larger liquid gallonage needed. For example, 80 gallons of the oil solution may be emulsified in 69 gallons of water by means of 1 gallon of sulfonated castor oil or other suitable emulsifying agent.

As a specific example of our invention, tests were made on a plot containing a number of crab grass plants in a turf also containing blue grass, bent grass, etc. The base oil employed in these tests was a hydrocarbon distillate having 0% unsaturation, an initial boiling point of 352° F., a 10% point of 380° F., a 50% point of 410° F., a 90% point of 440° F., and an end point of 480° F. The sprays in all cases were applied at the rate of 2 quarts per square rod and where two applications were applied, the second application was after a 14 day interval. A careful check was made of the condition of the various grasses at various intervals of time and the data obtained in these tests is set forth in the following table.

days had elapsed and the kill increasing to 70% after 42 days but that there was no apparent effect for the first week or two. When the base oil was applied twice with a 14 day interval, the ultimate kill was 78.5% and the per cent regrowth, which amounted to 21.5%, was smaller than in the case of a single application. The base oil containing 1% of beta-butoxy-beta'-thiocyano diethyl ether applied in only a single application effected a crab grass kill of 65% after 10 days, the kill being up to 91% after 14 days, 95% after 21 days and 99.5% after 42 days. The regrowth was practically nil when 1% of the thiocyano ether was added to the base oil. This remarkable increase in crab grass kill and prevention of crab grass regrowth with only a single application of the spray oil was accompanied by a somewhat increased retarding of the other grasses. The thiocyano ether composition caused somewhat greater retarding of blue grass or bent grass for the first 21 days but at 28 days 90% of the blue grass and 60% of the bent grass was recovered from single application treatments. By 42 days, the blue grass and bent grass were about 90% recovered in the test employing thiocyano ether. While the blue grass recovery was somewhat better with the single application of base oil, test 1 was markedly superior to the application of 2 base oil sprays; in other words a single application of the base oil itself did not produce the desired crab grass kill and 2 applications of the base oil were more detrimental to blue grass and bent grass while still failing to accomplish the crab grass kill attained with only 1 application of base oil containing thiocyano ether.

Another series of test data is reported in the following Table II wherein spays were likewise applied at the rate of 2 quarts per square rod (about 80 gallons per acre), wherein the base oil was the same as that employed in the first series

TABLE I

*Selective control of crab grass—Greenhouse tests*

[Grass clipped twice to 2 inches before treatments]

| Test | Material | No. Applications | No. Plants | Days after Initial Treatments ||||||||
|---|---|---|---|---|---|---|---|---|---|---|---|
| | | | | 10 | 14 | 21 || 28 || 42 ||
| | | | | Percent Dead | Percent Dead | Percent Dead | Percent Regrowth | Percent Dead | Percent Regrowth | Percent Dead | Percent Regrowth |
| 1 | Base Oil + 1% b-butoxy-b-thiocyanodiethyl ether. | 1 | 163 | 65.1 | 91.0 | 95.5 | 0.0 | 95.5 | 0.5 | 99.5 | 0.5 |
| 2 | Base Oil | 1 | 60 | 0.0 | 11.7 | 58.4 | 35.0 | 60.0 | 38.3 | 70.0 | 30.0 |
| 3 | Base Oil | 2 | 172 | 0.0 | 5.8 | 54.0 | 25.6 | 67.0 | 29.6 | 78.5 | 21.5 |
| 4 | Untreated | None | 106 | 0.0 | 0.0 | 0.0 | 0.0 | 0.0 | 0.0 | 0.0 | 0.0 |

First application was made when approximately 95% of the crab grass plants were flowering

| | | | | | |
|---|---|---|---|---|---|
| Condition of Blue Grass | Severely retarded. Somewhat more retarded in test 1 than in 2 and 3. | No change from 10 days | | 90% recovered from 1 application treatments, but no appreciable change in those receiving two applications of Base Oil. 40% recovered from test 1. | 100% recovered from 1 application and approximately 85% recovered from two applications of Base Oil; 90% recovered from test 1. |
| Condition of Bent Grass | Approximately 15% necrosis and 15% chlorosis. | No change from 10 days | | 60% recovered from 1 application treatments but severely retarded from 2 applications and showing 25% necrosis. | 90% recovered from 1 application and 80% recovered from two applications of Base Oil; 93% recovered from test 1. |

From results set forth in the above table, it will be noted that the single application of the base oil per se (test 2) was effective in killing about 60% of the crab grass after a period of 28 of tets and wherein the kerosene was one having substantially the same boiling range as the base oil. The results of this second series of tests were as follows:

TABLE II

Selective control of crab grass—Greenhouse tests

[Grass clipped to 3 inches before treatments.]

| Plot | Treatment | Water Dilution | No. Plants | Days After Initial Treatment | | | | | | |
|------|-----------|----------------|------------|---------|---------|----------|---------|----------|---------|----------|
|      |           |                |            | 10      | 14      |          | 21      |          | 26      |          |
|      |           |                |            | Percent Dead | Percent Dead | Percent Regrowth | Percent Dead | Percent Regrowth | Percent Dead | Percent Regrowth |
| A | 90% b-butoxy-b'-thiocyano diethyl ether + 10% emulsifier | 1-50 | 102 | 65.7 | 77.3 | 17.6 | 74.5 | 25.5 | 75.5 | 24.5 |
| B | 1% b-butoxy-b'-thiocyano diethyl ether + 12% emulsifier + 87% Kerosene | 1-3 | 147 | 0.0 | 35.4 | 55.6 | 28.5 | 71.5 | 42.2 | 57.8 |
| C | ¼% b-butoxy-b'-thiocyano diethyl ether in Base Oil | None | 116 | 6.9 | 50.9 | 19.8 | 60.3 | 39.7 | 71.6 | 28.4 |
| D | ¼% isobornyl thiocyano acetate in Base Oil | None | 118 | 12.7 | 72.0 | 6.8 | 90.0 | 10.0 | 91.2 | 8.8 |
| E | Untreated | | 125 | 0.0 | 0.0 | | 0.8 | | 0.8 | |

| | | | | | |
|--|--|--|--|--|--|
| Condition of Blue Grass | Plots A, B, and E normal. Plots C and D retarded. | Plots A, B, and E normal. Plots C and D severely retarded. | Plots A, B, and E normal. Plots C and D severely retarded. Plot C—3% necrosis. | Plots A and B 100% recovered. Plot D 97% recovered. Plot E normal. |
| Condition of Bent Grass | All plots normal. | Plots A and E normal. Plot B slight chlorosis. Plots C and D severely retarded. | Plots A, B, and E normal. Plot C severely retarded 3% Nec. Plot D severely retarded 8% Nec. | Plots A and B 100% recovered. Plot C 97% recovered. Plot D 95% recovered. Plot E Normal. |

In this series of tests the crab grass kill was somewhat less than in the first series of tests but nevertheless it was remarkably high. The isothiocyano ester employed in plot D is shown in these tests to be even more effective than the thiocyano ether of plot C. The emulsifier employed in the compositions used on plots A and B was a mixture of poly-oxyethylene sorbitol oleate and laurate, but it should be understood that sulfonated castor oil or any other suitable emulsifier may be employed.

Where the base oil contains 1% of the thiocyano ether or ester and is applied at the rate of about 80 gallons per acre, it will be apparent that the thiocyano ether or ester itself is used in an amount of about .8 gallon per acre. When such base oil is employed as the carrying medium for the thiocyano esters or ethers, the amount of said thiocyano esters or ethers per acre should be at least about .1 gal. for substantial effectiveness, but it should not exceed about 1 or 2 gallons per acre. When applied as an aqueous emulsion in the absence of oil, we have found that best results are attainable when about 1 to 4 volumes of thiocyano esters or ethers are emulsified in 100 volumes of water and the emulsion is applied in quantities sufficient to apply about 1 to 4 gallons of the thiocyano ester or ether itself per acre of grass turf. In other words, the base oil itself has a substantial killing power for crab grass and it also apparently enhances the effectiveness of the thiocyano esters and ethers when the latter are employed in base oil solution. The nature of the base oil solution is, of course, very important because lighter oils volatilize too rapidly and heavier oils tend to cause injury of desirable grasses. The absence of any appreciable amount of sulfonatable components is also essential in the base oil since sulfonatable components cause injury of desirable grasses. The base oil solutions should in no case be applied to turf at a rate substantially exceeding 150 gallons per acre and advantageous results are obtainable with a gallonage as low as 50 gallons per acre, a preferred dosage being in the range of about 80 to 100 gallons per acre with a base oil containing .1% to 2% of the organic thiocyanate dissolved therein.

We claim:

1. The method of selectively destroying crab grass in a grass turf containing crab grass and other grasses, which method comprises applying to said turf in a carrier liquid about .1 to 4 gallons per acre of a compound selected from the class consisting of thiocyano esters and ethers.

2. The method of claim 1 wherein the carrier liquid is water and the compound is applied in amounts of about 1 to 4 gallons per acre.

3. The method of claim 1 wherein the carrier liquid is a refined base oil boiling substantially entirely in the range of 350° F. to 500° F. and substantially free from sulfonatable components and wherein said compound is applied in amounts of .1 to 2 gallons per acre.

4. The method of selectively destroying crab grass from a turf containing crab grass and desirable grasses, which method comprises applying to said turf in a carrier liquid an amount in the range .1 to 4 gallons per acre of a compound selected from the class consisting of thiocyano esters and ethers which amount is sufficient to kill most of the crab grass without killing as much as 25% of the other grasses.

5. The method of selectively destroying crab grass from a turf containing crab grass and desirable grasses, which method comprises applying to said turf at least 50 but not more than 150 gallons per acre of a .1 to 2% solution of an organic thiocyanate in a refined hydrocarbon oil, said organic thiocyanate being selected from the class consisting of thiocyano ethers and esters and said oil boiling within the range of 350° to 500° F. and containing substantially no sulfonatable components.

6. The method of claim 5 wherein the organic thiocyanate is beta-butoxy-beta'-thiocyano diethyl ether.

7. The method of claim 5 wherein the organic thiocyanate is beta-beta'-dithiocyano diethyl ether.

8. The method of claim 5 wherein the organic thiocyanate consists essentially of isobornyl thiocyano acetate.

LOYD Q. BOYD.
ALBERT A. ENDRES.

REFERENCES CITED

The following references are of record in the file of this patent:

UNITED STATES PATENTS

| Number | Name | Date |
|---|---|---|
| 1,808,893 | Heckert | June 9, 1931 |
| 2,111,581 | Bray | Mar. 22, 1938 |
| 2,405,775 | Bradley | Aug. 13, 1946 |
| 2,467,235 | Searle | Apr. 12, 1949 |

OTHER REFERENCES

U. S. Dept. of Agriculture, Bur. Entomology and Plant Quarantine, Div. of Insecticide Investigations, Bull. #E 344, by Roark et al., page 46, May 1935.